(12) United States Patent
Pichai et al.

(10) Patent No.: US 6,251,958 B1
(45) Date of Patent: Jun. 26, 2001

(54) DEFOAMER PROCESS

(75) Inventors: Puvin Pichai, Collegeville; Kenneth Breindel, Lansdale, both of PA (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/288,593

(22) Filed: Apr. 8, 1999

Related U.S. Application Data
(60) Provisional application No. 60/083,234, filed on Apr. 27, 1998.

(51) Int. Cl.[7] ....................................................... B01F 3/12
(52) U.S. Cl. .............................. 516/31; 516/34; 516/117; 516/120; 516/131; 516/928
(58) Field of Search ..................................... 516/117, 120, 516/131, 928, 31, 34; 366/304

(56) References Cited

U.S. PATENT DOCUMENTS

| | | | |
|---|---|---|---|
| 3,404,869 | 10/1968 | Harder | 366/338 |
| 3,607,337 | * 9/1971 | Eisenmenger et al. | 106/491 |
| 3,652,453 | 3/1972 | MacDonnell | 516/123 |
| 3,677,963 | 7/1972 | Lichtman et al. | 516/116 |
| 3,723,342 | * 3/1973 | Shane et al. | 516/131 |
| 3,730,907 | 5/1973 | Shane et al. | 516/131 |
| 3,951,853 | 4/1976 | Suwala | 516/131 |
| 4,021,365 | * 5/1977 | Sinka et al. | 516/120 |
| 4,038,224 | 7/1977 | Eisenmenger et al. | 428/335 |
| 4,123,383 | * 10/1978 | Ihde, Jr. | 516/117 |
| 5,002,695 | * 3/1991 | Schulz et al. | 516/131 |

OTHER PUBLICATIONS

CRC Handbook of Chemistry and Physics, 63rd Edition, Edited by R.C. Weast & M.J. Astle (CRC Press, Inc. Boca Raton, Fl, copyright 1982) p. F–122. Month unknown.*

* cited by examiner

Primary Examiner—Daniel S. Metzmaier
(74) Attorney, Agent, or Firm—John E. Drach; Glenn E. J. Murphy; Henry E. Millson, Jr.

(57) ABSTRACT

A process for preparing a defoamer composition by providing a high-shear, in-line mixer having a rotor-stator assembly with at least one concentric set of shearing teeth which rotate at a tip speed of up to about 25 meters per second and feeding to said mixer a melt of a hydrophobic defoaming agent along with a functional carrier liquid at a controlled mass flow rate and temperature. After mixing, the mixture is cooled and discharged into a receiving vessel.

21 Claims, 1 Drawing Sheet

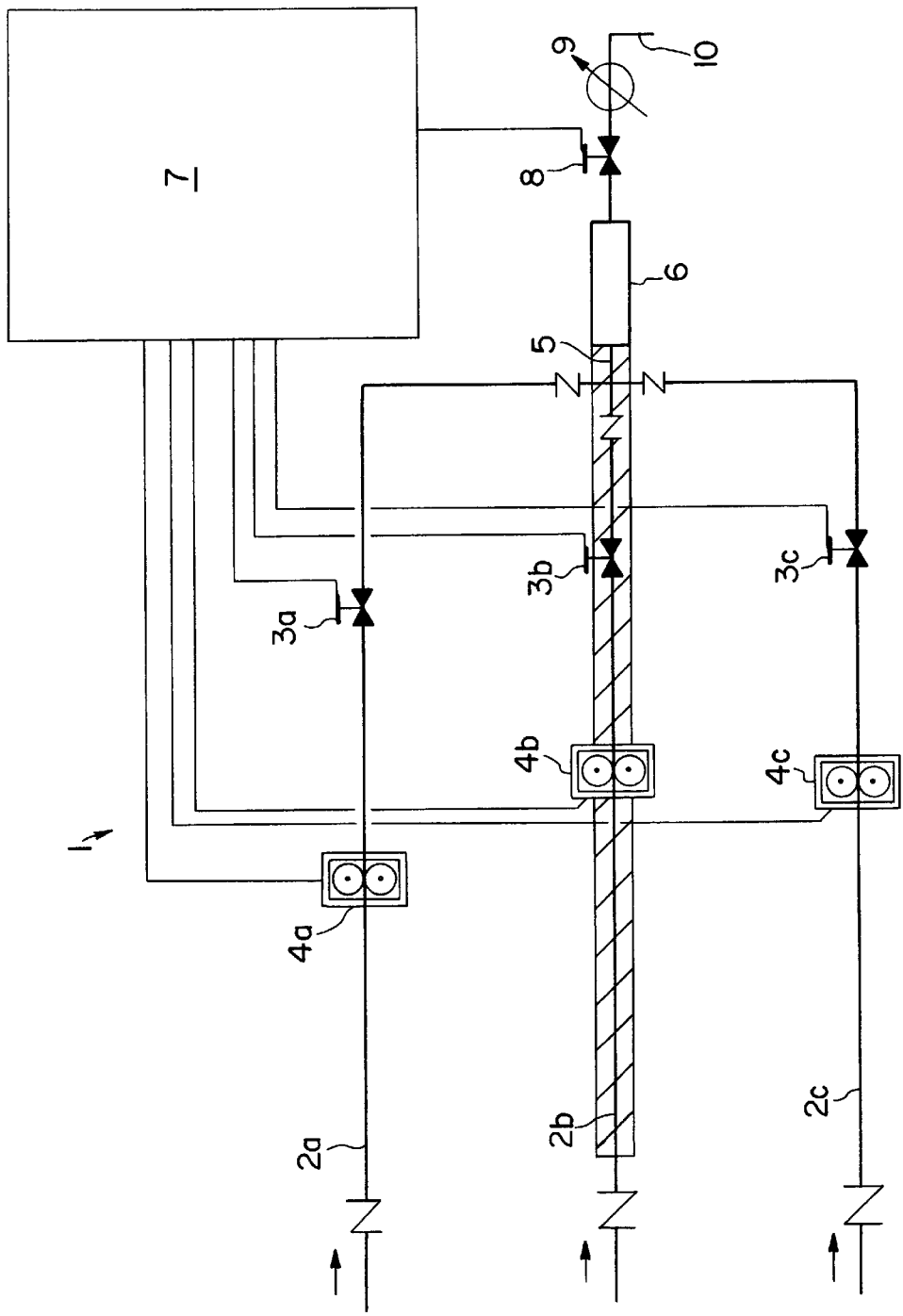

DEFOAMER PROCESS

CROSS-REFERENCE TO RELATED APPLICATIONS

This applicatioin claims priority from U.S. provisional application Ser. No. 60/083,234, filed Apr. 27, 1998, the disclosure of which is incorporated herein by reference.

BACKGROUND OF THE INVENTION

1. Field of the Invention

This invention relates to an improved process for the production of defoamer compositions, and more particularly, to the production of defoamer compositions using a high energy, in-line mixer apparatus therefor.

2. Discussion of Related Art

When carrying out industrial processes for which aqueous or substantially aqueous media are used, there frequently occur troublesome foams which, for example, can retard the speed of the process and impair the quality of the process products. Typical processes which are affected by these troublesome foams are, for example, processes for manufacturing and finishing paper, processes for finishing and dyeing various substrates, in particular textile materials, processes for manufacturing and applying paints, and also those processes for purifying and processing effluents by mechanical, chemical or biological means, which are carried out in conventional waste water purification plants.

To this end it is known to use antifoams, for example silicone oils, palm oil, linseed oil, lower alkyl glycols, and block copolymers of lower alkylene glycols in order to prevent foam formation or to break down foam that has formed. Such antifoams or defoamer compositions may comprise a single component or multiple components which may be combined by simply mixing together. However, many defoamer components are water-insoluble and thus some defoamer compositions contain the defoamer components in dispersion requiring intense mixing to produce the final defoamer composition.

Thus, dispersions of solid particles in water-insoluble organic liquids have been widely used for controlling foam in aqueous systems. Such dispersions usually employ agents to facilitate the spreading of the dispersions at the interface of the aqueous system with air. Anionic, cationic and non-ionic surfactants have been used for this purpose. These surfactants include such diverse materials as fatty acid soaps, amine salts, polyethylene oxide condensation products, polyethylene glycol esters and silicone oils. These spreading agents, although they increase the cost of a defoamer, often produce undesirable side effects, e.g., a loss of defoaming ability or an increase in viscosity when the defoamer is heated or stored for long periods of time.

One such composition for controlling foam in aqueous systems is disclosed in U.S. Pat. No. 3,951,853. The composition therein contains from about 75 to about 98 parts by weight of an organic liquid, from about 1 to about 15 parts by weight of small, solid particles of an amide suspended in the organic liquid, from about 0.1 to about 10 parts by weight of a base, from about 0.1 to about 5.0 parts by weight of a reactive chlorosilane monomer and from about 0 to about 3 parts by weight of an organic component. The amide is a reaction product of a polyamine having at least one alkylene group of 2 to 10 carbon atoms and the organic component is an organic polymer or a fatty acid of 10 to 20 carbon atoms or a glyceride of fatty acids of from 10 to 20 carbon atoms.

This composition is obtained by first preparing a pre-emulsion in an organic liquid by vigorously mixing a solution or a dispersion of the base in an organic liquid with a solution of the reactive chlorosilane. The finely divided amide particles are then dispersed in the pre-emulsion. The amide may be jet-milled to yield the finely divided particles which can simply be mixed into the above pre-emulsion. An alternate process described in U.S. Pat. No. 3,677,963, Lichtman et al, patented Jul. 18, 1972, may be used to produce the small particles of amide in the pre-emulsion. That process when applied to the compositions of the invention involves heating the amide with a viscosity reducing amount of chlorosilane monomer in sufficient organic liquid and from 0 to 3 parts by weight organic component to obtain a uniform homogenous melt and pouring the resulting melt into a cooling liquid, in this case, the pre-emulsion. The resulting suspension of amide particles may then be homogenized to form a stable dispersion wherein the reaction products of the base and chlorosilane function as dispersing and spreading agents. Such products based solely on an amide hydrophobe may be prepared by simply quenching a concentrated solution of melted amide in an organic component into a larger volume of organic components under controlled temperature conditions. In addition, other hydrophobic defoaming components such as hydrophobic silica may be employed. However, such dispersed defoamer compositions require a long cycle time for preparation, typically in a batch unit high-shear mixing apparatus which limits production capacity. In addition, optimum dispersion of the defoaming components is required to produce the desired particle size distribution necessary for defoamer compositions. In addition, it is sometimes necessary to further process the defoamer compositions in an expensive and high-maintenance homogenizer as well.

One type of mixing unit is a static mixer, also known as an interfacial surface generator. An interfacial surface generator is a static device which mixes fluids by passage of the fluid through the interfacial surface generator. Such mixing is obtained by division of the stream into a plurality of substreams or branches, recombination of the substreams into a main stream and subsequent division, repositioning and recombination until the desired degree of mixing has been obtained. Several interfacial surface generators are known and set forth for example, in U.S. Pat. No. 3,404,869. Such devices employ baffles positioned within a conduit to provide the desired division, repositioning and recombination. However, these devices do not supply the energy necessary to break up particles, especially when particle sizes less than 100 microns are desired.

It would be desirable if there were available a mixing device and a process which could provide the degree of mixing of streams controlled by ready variation of its parameters, and provide the energy input required to break up particles to micron size.

In addition, it would be highly desirable to avoid the afore-noted drawbacks of the present state of the art and provide a process for producing defoamer compositions which overcomes these disadvantages.

SUMMARY OF THE INVENTION

The present invention is generally directed to a process for producing defoamer or antifoam compositions, particularly a composition as disclosed in U.S. Pat. No. 3,951,853, using a high energy, in-line mixer having a rotor/stator assembly to obtain high-shear mixing of defoamer composition components.

The defoamer composition prepared by the process of this invention preferably comprises a. from about 75 to about 98 parts by weight of a functional carrier liquid,
b. from about 1 to about 15 parts by weight of a hydrophobic defoaming agent such as an amide which is a reaction product of a polyamine having at least one alkylene group of 2 to 10 carbon atoms and a fatty acid of from 6 to 18 carbon atoms,
c. from 0 to about 10 parts by weight of a base,
d. from 0 to about 5 parts by weight of a reactive chlorosilane monomer, and
e. from 0 to about 3 parts by weight of an organic component selected from the group consisting of an organic polymer, a fatty acid of 10 to 20 carbon atoms and a glyceride of fatty acids of from 10 to 20 carbon atoms.

A suitable high energy, in-line mixer having a rotor-stator assembly for use in the process of this invention is known as a DISPAX-REACTOR® available from IKA-Works USA, 2635 N. Chase Pkwy., S.E., Wilmington, NC 28405. Such a mixer is based upon the effects of mechanical high-frequency on a rotor-stator system with high circumferential speeds. Because of the high rotor speed, the medium to be processed is automatically sucked axially into the dispersing head and is then pressed radially through the slots of the rotor-stator arrangement. Due to the great acceleration, the material is subjected to very high shearing and thrusting forces. The additional high turbulence which occurs in the shearing gap between rotor and stator leads to an optimum mix of the suspension. The decisive factor for dispersing efficiency is the result of the shear gradient and the period of dwell of the particles in the shearing field.

It has been found that the use of a high energy mixer having a rotor-stator assembly (generator system) such as a DISPAX-REACTOR® is most effective in producing the desired particle size, i.e., average particle sizes of less than 10 microns, for a defoamer composition. The complex interaction of several crushing mechanisms occurs as a result of turbulent forces in the shearing gaps between several generator systems.

In one preferred embodiment of the process of this invention, the generator system configuration employed is known as a type T/6 available from IKA-Works USA which enables obtaining optimum particle fineness in producing a defoamer composition. In this particular rotor-stator assembly there are three concentric sets of shearing teeth which rotate at a tip speed of up to 25 meters per second. The DISPAX-REACTOR® type T/6 employs three such rotor-stator assemblies (generators) thus multiplying the dispersing effect. For process flexibility, the mixing chamber can be heated or cooled, and is designed for high pressure operation, up to 10 bars. Further, the unit may be employed in a continuous mode thus resulting in a streamlined process with shorter cycle times. In addition to excellent dispersing capacity, its sturdy construction and low energy consumption of the drive aggregates ensure high economy.

Although excellent results have been obtained with the afore-described DISPAX-REACTOR® mixers, the process of this invention is not limited to the use thereof, that is, other mixer units such as those available from Process Mixing Systems, Inc., 3930-T N. Ventura Dr., Suite 320, Arlington Heights, Ill. 60004 work as well provided that intense shear is imparted to the process stream. It is the process parameters that are critical to producing defoamer compositions having the required chemical and physical properties that enable satisfactory performance.

The mixer employed in the process of this invention is operated in a continuous mode and replaces conventional high-shear batch mixers whose long cycle times have been rate-limiting in existing production processes.

It has been found that the process of this invention provides shorter cycle times leading to higher thoughput rates and thus lower processing costs; more uniform control of process parameters leading to more uniform product specifications and consistent performance; reduced equipment costs, energy requirements and floor space requirements; lower maintenance of production equipment; is less labor-intensive; and provides improved particle size control of the resultant product. This allows optimum dispersion of the defoaming solid which in turn produces the desired particle size distribution required of defoamer or antifoam compositions. The small and uniform particle size distribution of the compositions enables obviating the use of expensive and high-maintenance homogenizers or media mills which are commonly employed to grind silica-containing compositions.

It has also been found that the process of this invention enables precise temperature controls of feed and outlet streams, precise mass flow controls of feed streams, maintains a molten hydrophobe stream of material such as an ethylene bis-stearamide melt in oil at a desired temperature within the mixing chamber by heat tracing and insulating lines and pumps, and permits the variation of total flow rates by varying the residence time in the mixing chamber.

In general, the present invention is directed to a process for producing a defoamer composition comprising:

(a) providing a mixing apparatus comprising a high energy in-line mixer having a rotor/stator assembly, the mixing apparatus having at least two inlet ports for receiving a predetermined amount of a functional liquid carrier, e.g., an organic liquid, and at least one defoaming agent component, a fluid port for combining the carrier liquid and the defoaming agent component into a single fluid stream, at least one interfacial surface generator in operative connection with the fluid port for mixing the carrier liquid and the defoaming agent component, a heat exchanger for cooling the outlet stream, and an outlet port connected to the interfacial surface generator(s) for discharging a formulated defoamer composition;

(b) introducing predetermined amounts of carrier liquid and defoaming agent component into the mixing apparatus through the inlet ports at controlled temperatures and mass flow rates;

(c) combining the functional carrier liquid and the defoaming agent component into a single fluid stream;

(d) mixing the single fluid stream in the interfacial surface generator(s) until a predetermined degree of mixing is obtained to provide a formulated defoamer composition of desired particle size;

(e) cooling the discharge stream via a heat exchanger to a desired temperature, and (f) discharging the defoamer composition through the outlet port.

In greater detail, the process of this invention comprises preparing a defoamer composition by melting a hydrophobic defoaming component, for example, a hydrophobic wax such as polyethylene or ethylene-bis-stearamide at a temperature of about 145° C. to about 150° C., in a portion of a functional carrier liquid such as an organic liquid. A suitable range of concentrations in this preparation is from about 10% to about 20% by weight of ethylene bis-stearamide in a functional carrier liquid. It should be noted that the amount of functional carrier liquid in the aforementioned preparation comprises about a 15% to 30% fraction of the total amount of functional carrier liquid that will be present in the final defoamer composition. The hot ethylene bis-stearamide/functional carrier liquid mixture is a uniform homogeneous solution which must be maintained at a temperature above about 140° C. to prevent solidification. The remainder portion (70–85%) of the functional carrier liquid is provided in a separate container at a temperature of about 0° C. to about 5° C. Both liquid stream preparations are then injected simultaneously into the rotor-stator chamber of a high-shear mixer preferably having multiple concentric sets of shearing teeth which rotate at a tip speed of up to 25 meters/second resulting in precipitation of the mixture into a fine particle size hydrophobic wax dispersion in oil. The exit stream is then cooled to about 25° C. to about 40° C. before being discharged into a receiving vessel. In a further aspect of this invention, the functional carrier liquid also known as the quench oil may contain hydrophobized silica in an amount of from about 1% to about 20% by weight of the quench oil. As a result of the intense shear of the mixer, the silica is also ground to an acceptable particle size range of less than about 50 microns. The output of the process of this invention provides an effective defoamer composition for water-based systems.

BRIEF DESCRIPTION OF THE DRAWING

The drawing discussed in the following is illustrative of an embodiment of an apparatus which may be employed in the invention and is not intended to limit the invention as encompassed by the claims forming part of the application.

The sole figure is a schematic view of one embodiment of an apparatus which may be employed in the invention for the continuous formulation of defoamer compositions in which defoamer composition components and a functional carrier liquid heated to the desired temperature are introduced into an interfacial surface generator, through multiple inlet ports, where they are subsequently mixed with high shear, cooled through a heat exchanger to the desired temperature, and discharged as a newly formulated defoamer composition through the outlet conduit.

Referring to the sole drawing, the principal components of the mixing apparatus 1 employed to carry out the present invention include a functional carrier liquid inlet port 2a and defoaming agent component inlet ports 2b and 2c for introducing carrier liquid and defoaming agent components to be formulated into a defoamer composition, and interfacial surface generator 6 for statically mixing the carrier liquid and defoaming agent components, heat exchanger 9 for cooling the outlet stream and outlet port 10 for dispensing the formulated defoamer composition and a control unit 7 for controlling the operation of the apparatus 1.

In operation, carrier liquid is introduced to the apparatus from a source, not shown, through inlet port 2a. Defoaming agent components are similarly fed from individual sources, not shown, through inlet ports 2b and 2c. Valves 3a, 3b, and 3c, are used to open and close inlet port 2a, 2b, and 2c so that carrier liquid and the various defoaming agent components may be introduced into the interfacial surface generator 6 through fluid port 5. Preferably, inlet ports 2b and 2c are steam traced and insulated to maintain the temperature of the defoaming agent components prior to their introduction to interfacial surface generator 6 as indicated in the figure by the hash marks. Pumps 4a, 4b and 4c are used to meter the carrier liquid and the defoaming agent components through inlet ports 2a, 2b and 2c and they are combined into a single fluid stream and fed through fluid port 5 into the interfacial surface generator 6.

The carrier liquid and defoaming agent components are sufficiently mixed in the mixing chamber 6 to formulate a particular defoamer composition, the defoamer composition is passed through heat exchanger 9 to cool to the desired temperature, then is discharged through outlet port 10. The freshly formulated defoamer composition is then ready for use or packaging.

While the apparatus 1 can be operated manually with the use of a minimal amount of manpower with respect to the opening and closing of valves 3a, 3b, 3c, and 8, as well as the actuation of pumps 4a, 4b and 4c, along with the interfacial surface generator 6, it is preferred that a control unit 7 be employed in operative connection with the apparatus to perform all of these functions. The type of control unit 7 which may be employed in the present invention is well known in the art. The control unit 7 is capable of being programmed so that predetermined amounts of carrier liquid and various defoaming agent components may be measured and subsequently introduced into the interfacial surface generator 6. Similarly, the control unit 7 can also be programmed to provide varying degrees of mixing for numerous types of defoamer compositions. In addition, the control unit 7 may be adapted to control the temperature of the carrier liquid and the defoaming agent components. Thus, according to the preferred embodiment of the present invention, all of the operating components of the apparatus 1 are electronically controlled, with variables such as temperature and flow amounts of carrier liquid and defoaming agent components to be admixed and degrees of mixing being programmed into and controlled by control unit 7.

The aqueous systems from which, according to the invention, foam can be removed or in which foam formation can be suppressed, are in particular dyebaths and finishing baths for textile materials, paper fibre suspensions which occur in paper manufacture, paper coating compositions or paints, water-borne adhesives, inks, polymer latexes, detergents, and food processing items.

DESCRIPTION OF PREFERRED EMBODIMENTS

The carrier liquid to be used in making the defoamer compositions of this invention may be selected from a variety of low cost, readily available organic liquids such as hydrocarbon oils and alcohols. Polyglycols, fuel oil, mineral seal oil, paraffin oil, naphthenic oils and fatty acids are examples of suitable organic liquids. Pure hydrocarbon liquids like cyclohexane, toluene, xylene or dodecane may also be used. The particular organic liquid to be used to make the uniform melt of amide for quick-chilling is one which does not have a boiling point below the melting point of the amide. Mixtures of two or more of these liquids may be used. The preferred organic liquid is one which will remain fluid over the range of temperatures to which the finished product will be subjected.

Useful amides for the purpose of this invention may be prepared by the reaction of a fatty acid with a primary polyamine. Suitable primary polyamines should have at least two primary amine groups separated by an alkylene group or groups of from two to six carbon atoms, e.g. ethylene diamine, propylene diamine, diethylene triamine, tetraethylene pentamine, hexamethylene diamine and the like. Suitable fatty acids should have from six to eighteen carbon atoms, e.g., hexanoic, lauric, oleic and stearic acids and hydroxylated acids such as ricinoleic acid or naphthenic acids such as are obtained as by-products of petroleum refining. Fatty acid mixtures from natural sources such as tallow, tall or seed oils may be used.

One of the amides useful in this invention is prepared in the following manner. A stainless steel reactor equipped with a condenser, water trap and agitator is charged with 95.7 parts by weight of bleached hydrogenated tallow fatty acids. The entire process is carried out in a nitrogen atmosphere. The fatty acids charge is heated to about 170° C. and 10.1 parts by weight of ethylene diamine is added with agitation. After the diamine is added, the reaction mixture is heated to about 182° C. and the temperature is maintained until the acid value of the reaction product is less than 5 mg KOH/g. and the alkalinity is less than 0.6% by weight. The resulting reaction product is then cooled to room temperature. If desired, the cooled mass can be ground to obtain the product in the form of a very fine powder. Non-amide hydrophobic waxes such as polyethylene or even silica may also be substituted for the amide.

The compositions of this invention may contain optional organic components such as polymers, fatty acids or glycerides of fatty acids. Useful polymers are those which are oil soluble including vinyl acetate copolymers with maleic acid esters, ethylene, propylene and butylene; polyalkylene oxide adducts such as methyl glucoside propoxylated with four moles of propylene oxide; glycerine alkoxylated with fifteen moles of ethylene oxide and forty-five moles of propylene oxide; the copolymer of lauryl methacrylate and vinyl pyrrolidone; methacrylate copolymers dissolved in refined neutral oil, and phenol modified coumarone indene resins and mixtures of these polymers. Useful fatty acids have from 10 to 20 carbon atoms, e.g., lauric, palmitic, stearic acids and the like. Useful glycerides include any of naturally occurring mixtures of fats of the fatty acids above, e.g., linseed oil, castor oil, lard, tallow and the like and synthetic mono- and diglycerides. It is possible to control the disintegration of the defoamer particles by adding such agents but they must be used cautiously to avoid long term product instability.

The compositions of this invention can be made by feeding a melt solution of ethylene bis-stearamide or other suitable hydrophobic defoaming agent such as polyethylene wax at a controlled mass flow rate and temperature to a high-shear mixer, preferably one having multiple concentric sets of shearing teeth. At the same time, a functional carrier liquid such as the afore-mentioned organic liquids is fed to the high-shear mixer at a controlled mass flow rate and temperature. The temperature of the melt of ethylene bis-stearamide is maintained at the desired temperature through the feed lines and pump. The mixing speed in rpm's of the high-shear mixer is adjusted to the desired setting. After a sufficient mixing period, the mixture is passed through a heat exchanger and cooled to a desired temperature whereafter the mixture is passed through an outlet port to a receiving vessel.

A small amount of the composition of this invention is required to control foam in an aqueous and organic liquid system. In the continuous filter washing of pulp in a Kraft mill, where a considerable amount of black liquor containing defoamer is recycled to the washers, as little as 100 cc per minute added to a 1000 gal/min brownstock flow can maintain foam at manageable levels. In formulating a latex paint, as much as 6.0 lbs. may have to be added to 100 gallons of paint to achieve satisfactory foam suppression. The exact amount of defoamer that will be needed will depend upon the amount of surfactant which is present in the particular aqueous system being defoamed.

The defoamer compositions produced by this invention may be evaluated by a routine defoamer screening procedure for an architectural paint consisting of three tests as described in the following.

A. Defoamer Activity Test—Red Devil Shaker Method

B. Defoamer Activity Test—Roller Application

C. Compatibility Test—Drawdown/Rub-Up

These procedures are described in the following pages.

Note: HEAT AGING—Duplicate ½ pint cans are prepared (as in Test A steps 1 and 2 followed by 5 minute stir-in of defoamer using a laboratory stirrer) for those defoamers which appear promising based on initial results. These cans are placed in an oven at 120° F. (49° C.). After two weeks at 120° F., the samples are evaluated via tests A, B and C to determine the effect of prolonged storage of the paint/defoamer system.

A. DEFOAMER ACTIVITY TEST—RED DEVIL SHAKER METHOD MATERIAL & EQUIPMENT

Red Devil Shaker (Model 5110-X)

½ pint paint cans

Paint gravity cup (weight per gallon cup)

Balance (500 gm. capacity min., accurate to ±0.01 gm)

Test medium—standard batch of defoamer-free paint (also free of entrained air)

Defoamer reference "standard"

Defoamer to be evaluated

PROCEDURE

1. Weigh 125 cc sample of test paint into ½ pint (250 cc) paint can.

2. Add defoamer being evaluated at a level of 0.5% by weight based on weight of paint.

3. Seal can and place on outer-most edge of Red Devil Paint Shaker clamp (farthest from axis of rotation) so that maximum arc is achieved.

NOTE: Cans must be placed in identical location on clamp for each test.

4. Shake for 5 minutes. Immediately after shaking, determine the weight/gallon of the shaker paint sample.

5. The decrease in density compared with that of the unshaken control paint sample is regarded as the amount of foam generated.

$$\% \text{ AIR ENTRAINED} = \frac{\text{wt./gal. (unshaken control)} - \text{wt./gal. (test sample with defoamer)}}{\text{wt./gal. (unshaken control)}}$$

NOTE:

1) A shaken blank (standard paint without defoamer) should be run for each batch of standard test paint to determine the "foaminess" of the test medium and to establish the general magnitude of defoamer activity.

2) When comparing a sample of a given defoamer with a "standard" the standard should be re-run side by side with the test sample each time. It should be noted that depending on the test medium being used, variations of several percent entrained air between acceptable defoamer samples are not unusual.

B. DEFOAMER ACTIVITY TEST—ROLLER APPLICATION

MATERIAL & EQUIPMENT

3" roller handle

3" roller cover, ⅜" nap roller pan

Sherwin Williams Test Paper

Shurline Brush & Roller Cleaner

PROCEDURE

1. Pre-soak 3" roller cover in distilled water and then spin dry using 10 strokes on Shurline Brush & Roller Cleaner.
2. Pour entire contents of ½ pint paint cans used in Test A (Shaker Test) into roller pan and saturate ⅜" nap roller.
3. Apply paint to 12"×13" sheet of Sherwin Williams paper mounted in a vertical position. Roller application technique should be consistent from test to test.
4. Immediately upon completion of roll-out, observe rate of bubblebreak.
5. Examine dry roll-outs for cratering resulting from delayed bubblebreak. Roll-outs resulting from various defoamers as well as a blank may be rated relative to each other.

C. DEFOAMER COMPATIBILITY TESTS

MATERIAL & EQUIPMENT

Leneta Form 2C sealed opacity charts

Bird Perforated Vacuum Plate

Bird Film Applicator 6", to deposit 3 mil wet film

PROCEDURE

1. Apply Leneta Opacity Chart to vacuum plate so that chart is held flat and firm against plate.
2. Pour contents of paint gravity cup (following each Shaker Test—Test A) onto Leneta Opacity Chart and drawdown using Bird Film Applicator to yield a 3 mil wet paint film.
3. Observe film for film irregularities such as fisheyes, orange-peel, crawling or other defoamer related defects.
4. If paint system is tinted, a "rub-up test" should be performed whereby a portion of the wet draw-down is rubbed with the finger in a circular motion until tacky or near dry. Any difference in color or intensity of the rubbed-up area compared with the surrounding film is indicative of pigment flocculation which may be affected by the defoamer.

For a fuller understanding of the nature and objects of this invention, reference may be made to the following examples. These examples are given merely to illustrate the invention and are not to be construed in a limiting sense. All parts, proportions, percentages and other quantities are by weight unless otherwise indicated.

EXAMPLE I

A defoamer composition was prepared consisting of the following final composition in parts by weight; 1.25 parts ethylene bis-stearamide (EBS), 25.74 parts paraffin oil (100 SUS), and 3.00 parts hydrophobized silica.

The EBS melt (part A) was prepared by melting 1.25 parts of EBS in 3.15 parts of paraffin oil at about 145° C. with good agitation in a vessel. To prevent the EBS from solidifying, the vessel, all transfer lines to the high-shear mixer, and the high-shear mixer's mixing chamber were heat traced and insulated.

The quench oil (part B) consisted of 22.59 parts of paraffin oil which was cooled to about 5° C. in a separate vessel with agitation.

The rotor-stator system of an IKA high-shear in-line mixer model D3–6 was energized at a tip speed of about 25 meters/second. The compositions of Part A and Part B were pumped into the mixing chamber of the high-shear mixer. The ratio of feed rates of Parts A and B was 1:5.13 by weight. After processing in the mixer, the mixture was passed through a heat exchanger to cool the product to a temperature of about 25° C. and then discharged to a receiving vessel. To the cooled product was added about 3.00 parts of hydrophobized silica that had been pre-milled to an average particle size of about 30 microns with good agitation. This resulted in a defoamer formulation having effective defoaming properties.

It was found that the bubble break time of this defoamer composition, as evaluated by the Defoamer Activity Test-Roller Application (test B, supra) was 27 seconds. By comparison, Foamaster® PL commercially available from Henkel Corporation, Ambler, Pa., an industrial benchmark defoamer product, had a bubble break time of 88 seconds. In addition, it was found that after heat-aging at 50° C. for two weeks, the defoamer composition prepared by the instant process had a bubble break time of 10 seconds, compared to 30 seconds for the Foamaster® PL product.

EXAMPLE II

A defoamer composition was prepared having the same formulation as in Example I but prepared as follows.

Part A was prepared exactly as described in Example I.

Part B consisted of 22.59 parts of paraffin oil and 3.00 parts of hydrophobized silica that had not been pre-milled and had an average particle size of more than 100 microns. This mixture was cooled to about 5° C. with good agitation.

Parts A and B were pumped into the high-shear in-line mixer employed in Example I and the resulting mixture was cooled to about 5° C. as in Example I. The cooled outlet stream provided the final defoamer composition having effective defoaming properties as evaluated by the performance tests described in Example I.

While the invention has been described with reference to certain specific embodiments thereof, it is understood that it is not to be so limited since alterations and changes may be made therein which are within the full and intended scope of the appended claims.

What is claimed is:

1. The process of preparing a defoamer composition comprising
   a. from about 75 to about 98 parts by weight of a functional carrier liquid,
   b. from 1 to about 15 parts by weight of a hydrophobic defoaming agent comprising an amide which is a reaction product of a polyamine having at least one alkylene group of 2 to 10 carbon atoms and a fatty acid of from 6 to 18 carbon atoms,
   c. from 0 to about 10 parts by weight of a base,
   d. from 0 to about 5 parts by weight of a reactive chlorosilane monomer, and
   e. from 0 to about 3 parts by weight of an organic component selected from the group consisting of an organic polymer, a fatty acid of 10 to 20 carbon atoms and a glyoeride of fatty acids of from 10 to 20 carbon atoms;

comprising the steps of:
   A. providing a high-shear, in-line mixer having a rotor-stator assembly with at least one concentric set of shearing teeth which rotate at a tip speed of up to about 25 meters per second;
   B. melting component b. in a portion of component a.;
   C. adjusting the mixing speed of the rotor-stator assembly to a desired setting;

D. feeding the resulting hot melt prepared in step B. into the rotor-stator assembly of said mixer at a controlled mass flow rate and temperature;

E. simultaneously feeding the remaining portion of the component a. carrier liquid into the rotor-stator assembly of said mixer at a controlled mass flow rate and temperature;

F. after obtaining the desired mixing of said melt from step B. and said carrier liquid, cooling the mixture to a desired temperature; and G. discharging said mixture from said mixer into a receiving vessel.

2. A process as in claim 1 wherein said defoamer composition has an average particle size of less than about 10 microns.

3. A process as in claim 1 wherein said rotor-stator assembly has three concentric sets of shearing teeth.

4. A process as in claim 1 wherein said melt of said hydrophobic defoaming in step B. has a temperature of from about 145° C. to about 150° C.

5. A process as in claim 1 wherein said melt of said hydrophobic defoaming agent is present in the functional carrier liquid in step B in an amount of from about 10% to about 20% by weight.

6. A process as in claim 5 wherein said melt of said hydrophobic defoaming agent present in said functional carrier liquid has a temperature above about 140° C. when fed to said mixer in step D.

7. A process as in claim 1 wherein said functional carrier liquid comprises an organic liquid.

8. The process of claim 1 wherein the remaining portion of component a. in step E. is at a temperature of from about 0° C. to about 5° C.

9. A process as in claim 1 wherein said mixture in step F. is cooled to a temperature of from about 25° C. to about 40° C. prior to discharge from said mixer.

10. A process as in claim 1 wherein said functional carrier liquid contains from about 1% to about 20% by weight of hydrophobized silica, based on the weight of said functional carrier liquid.

11. A process as in claim 1 wherein said functional carrier liquid is selected from the group consisting of fuel oil, mineral seal oil, paraffinic oil, naphthenic oil, fatty acids, cyclohexane, xylene, toluene, dodecane and polyglycols.

12. A process as in claim 1 wherein the amide is the reaction product of a polyamine selected from the group consisting of ethylene diamine, butylene diamine, diethylene triamine, triethylene tetramine, hexamethylene diamine, decamethylene diamene, hydroxyethyl ethylene diamine, and 1:3-diamino-2-propanol; with a fatty acid selected from the group consisting of hexanoic acid, decanoic acid, lauric acid, palmitic acid, oleic acid stearic acid, ricinoleic acid, naphthenic acids, tall oil acid, tallow fatty acid, and hydrogenated tallow fatty acid.

13. A process as in claim 1 wherein the base is present and is selected from the group consisting of a primary amine, secondary amine, polyamine having from 1 to 6 carbon atoms for each nitrogen atom, ammonium salts of organic acids having from 1 to 20 carbon atoms, alkali metal salts of organic acids having 1 to 20 carbon atoms, ammonia, sodium hydroxide, sodium sulfate, sodium silicate, sodium borate, trisodium phosphate and potassium dichromate.

14. A process as in claim 1 wherein the reactive chlorosilane monomer is present and is selected from the group consisting of trimethylchlorosilane, dimethyldichlorosilane, methyltrichlorosilane, diphenyldichlorosilane and mixtures of these compounds.

15. A process as in claim 1 wherein the organic component is present and is selected from the group consisting of copolymer of vinyl acetate and fumaric acid esterified with a tallow alcohol, copolymer of vinyl acetate with maleic acid esters, copolymer of vinyl acetate with ethylene, copolymer of vinyl acetate with propylene, copolymer of vinyl acetate with butylene, ethyl glucoside alkoxylated with four moles of propylene oxide, glycerine alkoxylated with fifteen moles of ethylene oxide and forty-five moles of propylene oxide, copolymer of lauryl methacrylate and vinyl pyrrolidone, methacrylate copolymer dissolved in refined oil, blown hydrogenated soya oil, blown vegetable oil, blown caster oil, soya alkyd, phenol modified coumarone indene resin, glycerol ester of gum rosin, glycerine ester of polyvinylpyrrolidone lauric acid, palmitic acid, stearic acid, linseed oil, caster oil, lard and tallow.

16. A process as in claim 1 wherein the functional carrier liquid (a) is paraffinic oil, the amide (b) is stearic diamide of ethylene diamine, the base (c) is ethylene diamine and the chlorosilane monomer (d) is dimethyidichlorosilane.

17. A process as in claim 1 wherein the functional carrier liquid (a) is paraffinic oil, the amide (b) is stearic diamide of ethylene diamine, the base (c) is potassium hydroxide and the chlorosilane monomer (d) is dimethyidichlorosilane.

18. The process of preparing a defoamer composition comprising a. from about 75 to about 98 parts by weight of a functional carrier liquid, b. from about 1 to about 15 parts by weight of a hydrophobic defoaming agent comprising an amide which is a reaction product of a polyamine having at least one alkylene group of 2 to 10 carbon atoms and a fatty acid of from 6 to 18 carbon atoms, c. from 0 to about 10 parts by weight of a base, d. from 0 to about 5 parts by weight of a reactive chlorosilane monomer, and e. from 0 to about 3 parts by weight of an organic component selected from The group consisting of an organic polymer, a fatty acid of 10 to 20 carbon atoms and a glyceride of fatty acids of from 10 to 20 carbon atoms;

comprising the steps of:

A. providing a mixing apparatus comprising a high shear in-line mixer having a rotor-stator assembly with more than one concentric set of shearing teeth which rotate at a tip speed of up to about 25 meters per second, the mixing apparatus having at least two inlet ports, and a fluid port, an outlet port, and a heat exchanger for cooling an outlet stream;

B. feeding a melt of said hydrophobic defoaming agent in a portion of said functional carrier liquid to a feed line and pump connected to said mixer at a controlled mass flow rate and temperature;

C. feeding the remaining portion of said functional carrier liquid to a feed line and pump connected to said mixer at a controlled mass flow rate and temperature;

D. simultaneously introducing said melt and said functional carrier liquid to said rotor-stator assembly in controlled proportions and adjusting the mixing speed of said assembly to a desired setting and mixing the resulting mixture until a predetermined degree of mixing is obtained to provide a formulated defoamer composition of desired particle size;

E. cooling the defoamer composition to a desired temperature; and

F. discharging the defoamer composition into a receiving vessel.

19. A process as in claim 18 wherein said melt of said hydrophobic defoaming agent in step B. has a temperature of from about 145° C. to about 150° C.

20. A process as in claim 18 wherein in step B component b is present in an amount of from about 10% to about 20% by weight of said portion of component a.

21. The process of claim 18 wherein in step C. the functional carrier liquid is at a temperature of from about 0° C. to about 5° C.

\* \* \* \* \*